(12) United States Patent
Silvestri (10) Patent No.: US 11,987,111 B2
(45) Date of Patent: May 21, 2024

(54) INTEGRATED ELECTRIC DRIVE AXLE LAYOUT

(71) Applicant: DANA GRAZIANO S.R.L., Turin (IT)

(72) Inventor: Marco Silvestri, Rivoli (IT)

(73) Assignee: DANA GRAZIANO S.R.L., Rivoli (IT)

(*) Notice: Subject to any disclaimer, the term of this patent is extended or adjusted under 35 U.S.C. 154(b) by 0 days.

(21) Appl. No.: 17/819,520

(22) Filed: Aug. 12, 2022

(65) Prior Publication Data

US 2024/0051379 A1  Feb. 15, 2024

(51) Int. Cl.
| | |
|---|---|
| *F16H 57/037* | (2012.01) |
| *B60K 1/00* | (2006.01) |
| *B60K 17/08* | (2006.01) |
| *B60K 17/16* | (2006.01) |
| *B60T 1/00* | (2006.01) |
| *F16H 37/08* | (2006.01) |
| *F16H 57/021* | (2012.01) |

(Continued)

(52) U.S. Cl.
CPC ............. *B60K 1/00* (2013.01); *B60K 17/08* (2013.01); *B60K 17/165* (2013.01); *B60T 1/005* (2013.01); *F16H 37/0813* (2013.01); *F16H 57/021* (2013.01); *F16H 57/037* (2013.01); *H02K 7/003* (2013.01); *H02K 7/116* (2013.01); *H02K 9/19* (2013.01); *B60K 2001/001* (2013.01); *F16H 2057/02034* (2013.01); *F16H 2057/02052* (2013.01)

(58) Field of Classification Search
CPC ...... B60K 2001/001; B60K 2001/0416; B60K 6/36; B60K 6/405; B60K 2007/0061; B60K 1/00; B60K 17/08; B60K 17/165; F16H 57/021; F16H 57/037; F16H 2057/02034; F16H 2057/02052; F16H 37/0813; B60T 1/005; H02K 7/003; H02K 7/116; H02K 9/19

See application file for complete search history.

(56) References Cited

U.S. PATENT DOCUMENTS

| | | | |
|---|---|---|---|
| 9,534,665 B1 * | 1/2017 | Pritchard | ................. B60K 1/00 |
| 9,641,039 B2 | 5/2017 | Smetana | |

(Continued)

FOREIGN PATENT DOCUMENTS

CN       110266146 A       9/2019

*Primary Examiner* — Jacob S. Scott
*Assistant Examiner* — Farhana Pervin
(74) *Attorney, Agent, or Firm* — McCoy Russell LLP (57) ABSTRACT

Systems are provided for increasing an efficiency of an electric drive axle, and reducing a number of components and weight of the axle. In one example, an electric drive assembly comprises an electric motor having a rotor shaft supported by a first rotor shaft bearing and a second rotor shaft bearing; a gearbox having a layshaft layout, where at least one input gear of the gearbox is mounted on the rotor shaft; and a multi-piece housing, the multi-piece housing including a first housing section supporting the first rotor shaft bearing and a stator of the electric motor; the first housing section defining an inner boundary of a motor cooling jacket; and a second housing section partially overlapping with the first housing section, the second housing section partially enclosing the gearbox and partially enclosing the electric motor; the second housing section defining an outer boundary of the motor cooling jacket.

17 Claims, 4 Drawing Sheets

(51) Int. Cl.
  *H02K 7/00* (2006.01)
  *H02K 7/116* (2006.01)
  *H02K 9/19* (2006.01)
  *F16H 57/02* (2012.01)

(56) References Cited

U.S. PATENT DOCUMENTS

| | | | | |
|---|---|---|---|---|
| 10,281,021 | B2* | 5/2019 | Ohmura | B60K 17/16 |
| 10,876,628 | B2* | 12/2020 | Gruber | B60K 1/00 |
| 11,038,396 | B2* | 6/2021 | Raya | B60K 11/02 |
| 11,054,019 | B2* | 7/2021 | Lamm | F16H 57/0457 |
| 11,192,436 | B1* | 12/2021 | Puiu | B60K 17/16 |
| 11,235,660 | B2 | 2/2022 | Engerman | |
| 2003/0173840 | A1* | 9/2003 | Seniawski | H02K 5/203 |
| | | | | 903/952 |
| 2011/0050013 | A1* | 3/2011 | Mogi | F16H 57/0476 |
| | | | | 310/83 |
| 2016/0355084 | A1* | 12/2016 | Uozumi | H02K 7/006 |
| 2018/0180150 | A1* | 6/2018 | Hiyoshi | B60K 1/00 |
| 2019/0263377 | A1* | 8/2019 | Ikushima | B60T 1/062 |
| 2020/0096084 | A1* | 3/2020 | Engerman | F16H 37/042 |
| 2020/0292042 | A1* | 9/2020 | Engerman | F16D 25/06 |
| 2021/0231213 | A1* | 7/2021 | Miebach | F16H 63/3425 |
| 2021/0394600 | A1* | 12/2021 | Absenger | F16H 57/045 |
| 2022/0107020 | A1* | 4/2022 | Ooki | B60T 1/005 |
| 2022/0163105 | A1 | 5/2022 | Engerman | |
| 2022/0320946 | A1* | 10/2022 | Varela | H02K 9/19 |
| 2022/0320966 | A1* | 10/2022 | Yazaki | F02C 7/36 |
| 2023/0045442 | A1* | 2/2023 | Oshidari | F16H 48/10 |

* cited by examiner

INTEGRATED ELECTRIC DRIVE AXLE LAYOUT

TECHNICAL FIELD

Embodiments of the subject matter disclosed herein relate generally to an electric drive axle.

BACKGROUND

An electric drive axle may include an electric motor coupled with a gearbox. A rotor shaft of the electric motor may be coupled to an input gear shaft of the gearbox via a gear of the gearbox. The input gear shaft may be supported by a first set of two dedicated bearings, and the rotor shaft may be supported by a second set of two dedicated bearings. As a result of the first set of bearings supporting the input gear shaft being independent of the second set of bearings supporting the rotor shaft, a misalignment may develop between the input gear shaft and the rotor shaft, which may reduce an efficiency and/or a performance of the electric drive axle. Additionally, wear on the electric drive axle may increase, reducing a useful life of one or more components of the electric drive axle and generating additional costs due to earlier-than-necessary replacement.

SUMMARY

In one example, the issues described above may be addressed by an electric drive assembly, comprising an electric motor having a rotor shaft supported by a first rotor shaft bearing and a second rotor shaft bearing; a gearbox having a layshaft layout, where at least one input gear of the gearbox is mounted on the rotor shaft; and a multi-piece housing, the multi-piece housing including a first housing section supporting the first rotor shaft bearing and a stator of the electric motor; the first housing section defining an inner boundary of a motor cooling jacket; and a second housing section partially overlapping with the first housing section, the second housing section partially enclosing the gearbox and partially enclosing the electric motor; the second housing section supporting the second rotor shaft bearing; the second housing section defining an outer boundary of the motor cooling jacket. By mounting input gears on the rotor shaft, a dedicated input shaft may not be included in the electric drive axle, thereby reducing a size of the electric drive assembly, reducing a probability of misalignment issues, decreasing a weight of the electric drive assembly, and increasing an efficiency of the electric drive assembly, in comparison to e-axles with input shafts supported by a pair of bearings. Additionally, by dividing the housing into three independent sections formed as single pieces, components of the electric drive assembly may be installed and assembled into recesses of each independent section from one of two opposing sides, allowing the electric drive assembly to be assembled in a quick and efficient manner. Further, the cooling jacket may be created at an interface between overlapping housing sections enclosing the electric motor, based on cooling jacket channels formed by recesses in one or both of the overlapping housing sections, which may reduce a manufacturing and/or assembly time of the electric drive assembly and increase a space efficiency of the electric drive assembly.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

The drawings illustrate specific aspects of the described systems and methods. Together with the following description, the drawings demonstrate and explain the structures, methods, and principles described herein. In the drawings, the size of components may be exaggerated or otherwise modified for clarity. Well-known structures, materials, or operations are not shown or described in detail to avoid obscuring aspects of the described components, systems and methods.

DETAILED DESCRIPTION

Figure 1:
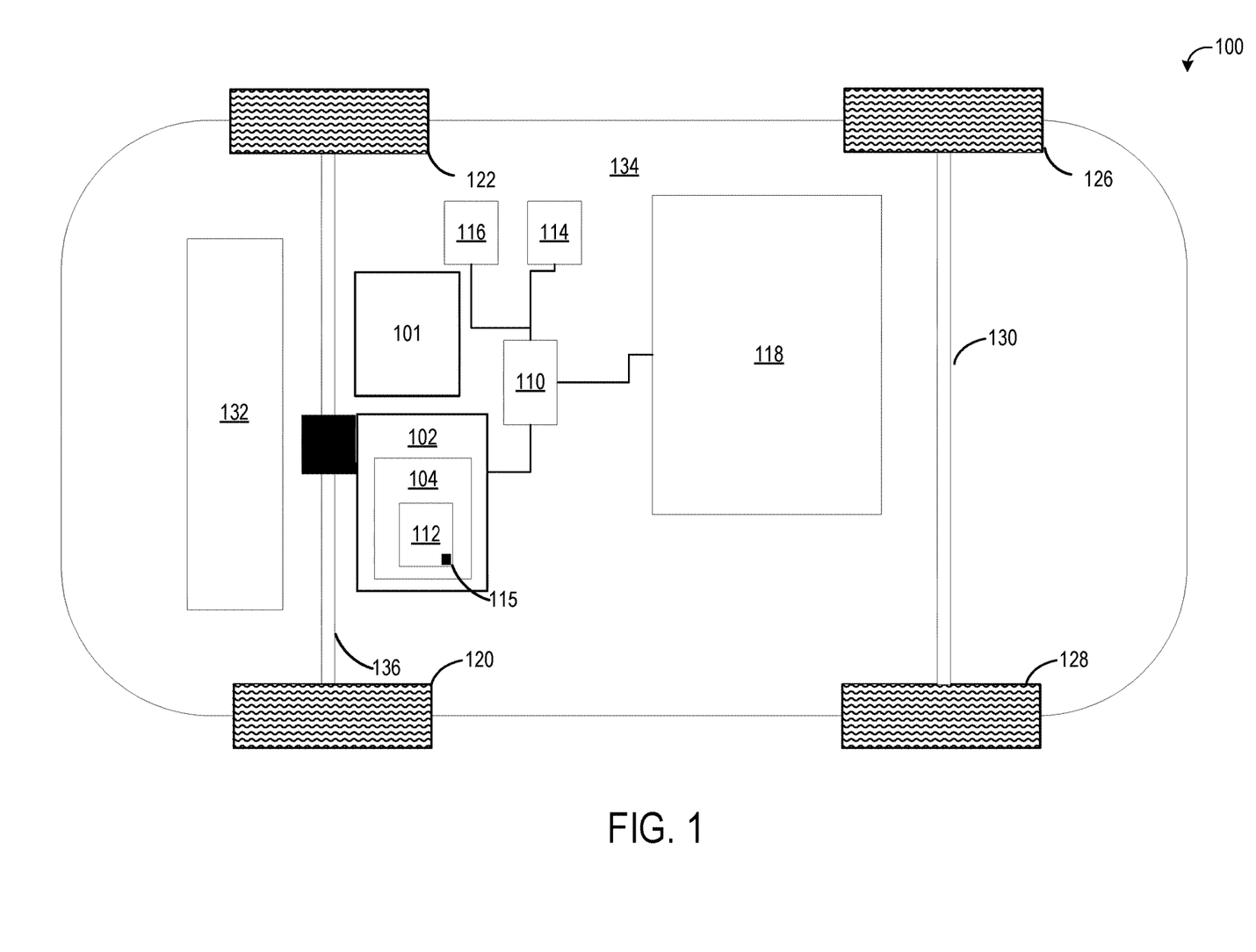
FIG. 1 schematically shows a vehicle including an electric drive axle, in accordance with one or more embodiments of the present disclosure.
Figure 2:
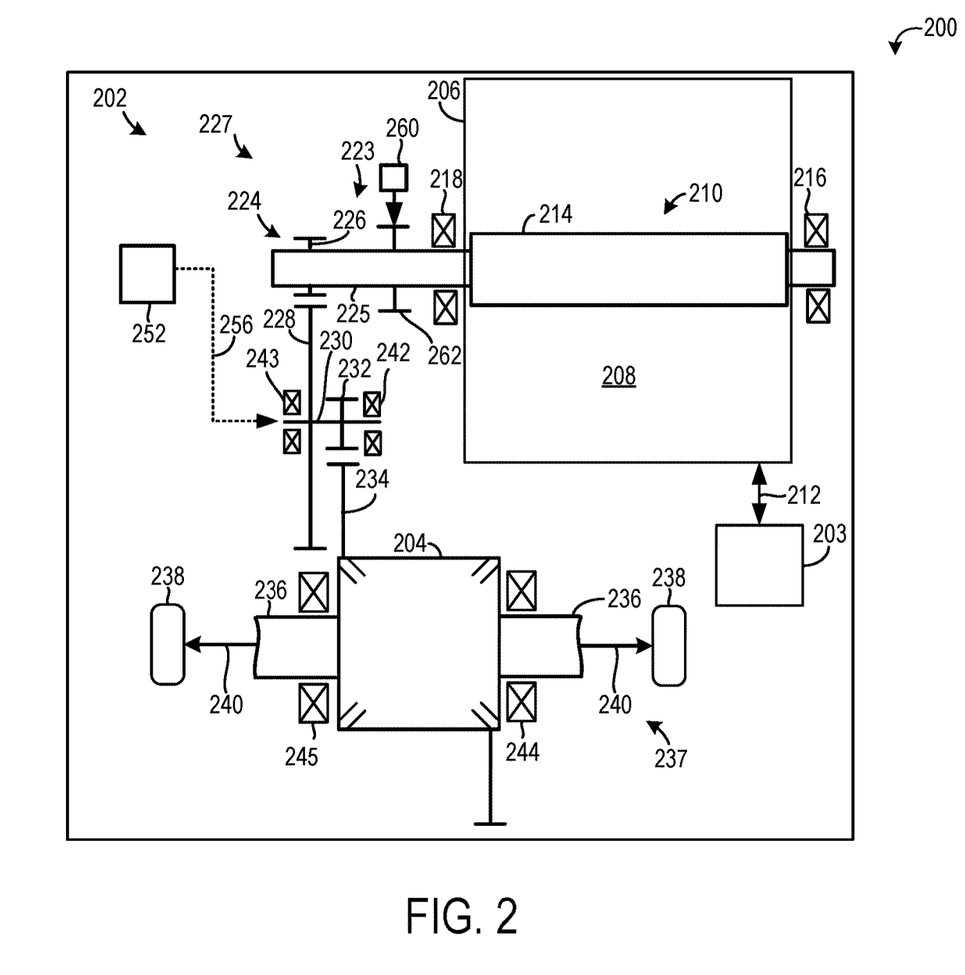
FIG. 2 shows schematic stick diagram of an electric drive axle, in accordance with one or more embodiments of the present disclosure.
Figure 3:
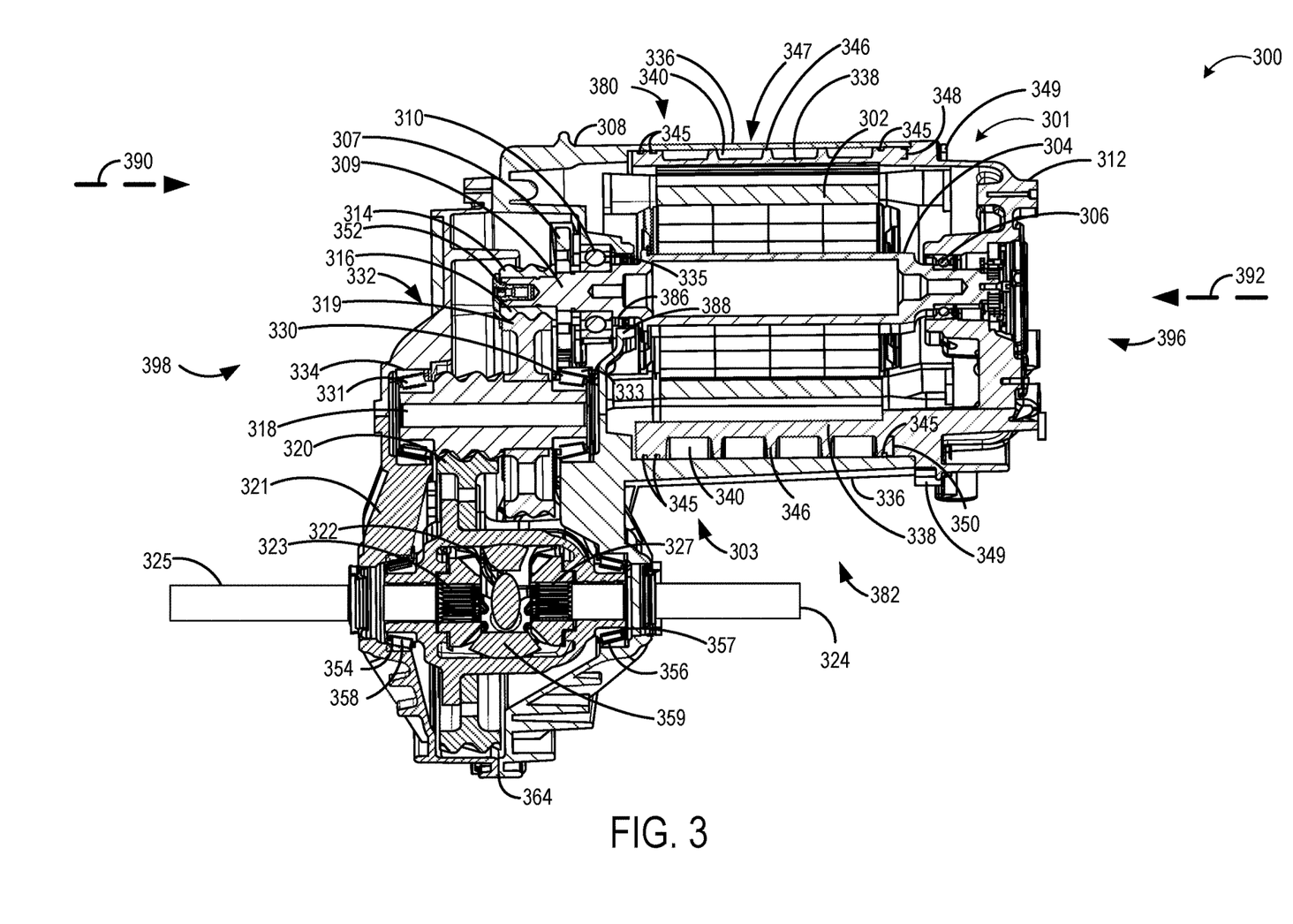
FIG. 3 shows an electric drive axle with an integrated layout, in accordance with one or more embodiments of the present disclosure.

The following disclosure relates to an electric drive assembly of a vehicle, such as the vehicle shown by FIG. 1. An exemplary electric drive assembly is shown in FIG. 3, and a schematic diagram of the exemplary electric drive assembly is shown in FIG. 2. The exemplary electric drive assembly may be assembled by following one or more steps of the method described in FIG. 4.

Referring now to FIG. 1, an example vehicle 100 is shown. In some examples, vehicle 100 may be a hybrid vehicle configured to provide torque to one or more wheels from multiple sources, such as engine 101 and electric motor 102. In other examples, vehicle 100 is configured to provide torque to the one or more wheels via only one of engine 101 or electric motor 102. In the example in which vehicle 100 is a hybrid vehicle, operation of the vehicle 100 may be adjusted between various different modes in which torque is supplied to the one or more wheels via only engine 101, via only electric motor 102, or via a combination of engine 101 and electric motor 102. Electric motor 102 may be a motor/generator configured to provide torque output to the one or more wheels and to generate electrical energy during operation of the vehicle 100 (e.g., via regenerative braking, as one example). Vehicle 100 is provided as an example of a system including an electric axle (also referred to herein as an E-axle) as described herein. As such, electric motor 102 may be referred to as E-axle 102. However, vehicle 100 is not intended to be limiting, and in some examples E-axle 102 may be included in vehicles having a different configuration (e.g., a different number and/or relative configuration of wheels and/or other components).

Vehicle 100 may be powered by electric motor 102 and/or engine 101, which generates torque in a drive wheel 120 when one or more clutches are engaged via a gearbox 104 of E-axle 102. In FIG. 1, E-axle 102 is rotatably coupled to an input of a differential gear assembly 124, which may generate a torque at one or more of a first drive wheel 120 and a second drive wheel 122 via drive axle 136. In some examples, the torque may be applied to only one drive wheel, or the torque applied to first drive wheel 120 and second drive wheel 122 by differential gear assembly 124 may be different (for example, during cornering of the vehicle or operation on an uneven ground surface), and in some conditions it may be approximately the same (for example, while driving the vehicle straight on a level ground surface, without cornering). Vehicle 100 may also include one or more free wheels, such as free wheels 126 and 128 mounted on free axle 130. Free wheels 126 and 128 may rotate as the vehicle is driven without being directly propelled by engine 101 or electric motor 102 (e.g., the engine and electric motor do not apply torque directly to the axle coupled to the free wheels). In other embodiments, additional free wheels may be included on free axle 130, and/or additional free axles may be included in vehicle 100, each of which may include a plurality of wheels. For example, heavy trucks or buses may have additional front and/or rear axles to distribute the weight of cargo, and each axle may include two wheels on each side.

As shown in the illustrated example, first drive wheel 120 and second drive wheel 122 may be front wheels. In other embodiments, first drive wheel 120 and second drive wheel 122 may be rear wheels, and the front wheels may be free wheels, or a transfer case (not depicted in FIG. 1) may be used to power all the wheels on vehicle 100, for example, in the case of 4-wheel drive vehicles or all-wheel-drive vehicles. The position or number of drive wheels on vehicle 100 should not be construed as limiting the scope of this disclosure.

In various embodiments, gearbox 104 may be an automatic gearbox, whereby shifting of one or more gears of gearbox 104 may be handled automatically by an electronic controller 110. Gearbox 104 is described in further detail below in reference to FIG. 2.

For automatic shifting, electronic controller 110 may be communicatively coupled to a shift assembly 112 of gearbox 104 that engages gears of gearbox 104. For example, electronic controller 110 may command the shift assembly 112 to various positions in order to engage and/or disengage gears of gearbox 104. Shift assembly 112 may include actuator sensors from which the electronic controller 110 may receive data used to control operation of shift assembly 112 (e.g., to adjust a selected gear of gearbox 104). Electronic controller 110 may also receive input from other sensors of vehicle 100, such as wheel sensors, pedal position sensors, temperature sensors, pressure sensors, speed sensors, throttle sensors, battery charge sensors, air-fuel ratio sensors, etc. Electronic controller 110 may send control signals to various actuators communicatively coupled to E-axle 102, engine 101, and/or other components of vehicle 100. The various actuators may include motors of the shift assembly that engage the gears of gearbox 104, for example, by sliding synchronizer rings and clutches along an output shaft of gearbox 104 via shift forks (not depicted in FIG. 1). The various actuators may also include, for example, various valves, throttles, fuel injectors, etc. The types of sensors and actuators listed herein are for illustrative purposes and any type of sensors and/or actuators may be included without departing from the scope of this disclosure.

Shift assembly 112 may include an oil temperature sensor, such as oil temperature sensor 115 shown schematically in FIG. 1. Controller 110 may measure a temperature of oil within gearbox 104 via signals (e.g., electronic signals) received by the controller 110 via oil temperature sensor 115 (e.g., oil temperature sensor 115 may be electrically coupled with controller 110 and in electronic communication with controller 110). In some examples, oil temperature sensor 115 may be arranged within a gearbox portion of gearbox 104 (e.g., a portion of the gearbox 104 configured to house gears of gearbox 104).

Electronic controller 110 may be a microcomputer, which may include a microprocessor unit, input/output ports, and an electronic storage medium for executable programs and calibration values. Electronic controller 110 may include non-transitory computer readable medium (memory) in which programming instructions are stored, and may be programmed with computer readable data representing instructions executable to perform the methods described below, as well as other variants that are anticipated but not specifically listed. Memory as referenced herein may include volatile and non-volatile or removable and non-removable media for a storage of electronic-formatted information such as computer readable instructions or modules of computer readable instructions, data, etc. Examples of computer memory may include, but are not limited to RAM, ROM, EEPROM, flash memory, or any other medium which can be used to store the desired electronic format of information and which can be accessed by the processor or processors or at least a portion of a computing device. Electronic controller 110 may be electrically coupled to a battery 114 and a starter 116, which may be used to provide initial power to the controller and/or start the engine.

E-axle 102 may be powered by a battery pack 118. Battery pack 118 may be an energy storage device configured to deliver electrical power to various components of the electrical system of the vehicle 100 including supplying current to E-axle 102 coupled to front wheels 120 and 122 and/or other powered wheels of vehicle 100. Battery pack 118 may be electrically coupled to E-axle 102 and/or electronic controller 110. Electronic controller 110 may regulate a power supplied by battery pack 118 to E-axle 102 in order to increase or decrease the speed of vehicle 100.

Engine 101 may be powered by fuel such as gasoline, diesel fuel, natural gas, biofuels, or any other combustible fuel; and accordingly, vehicle 100 may include a fuel tank connected to engine 101 via a fuel pump and intake system. Engine 101 and/or E-axle 102 may be positioned on a chassis 134 in a variety of configurations. For example, engine 101 and E-axle 102 may be positioned proximate to each other, or engine 101 and electric motor may be positioned further apart from each other along the chassis 134.

Gearbox 104, E-axle 102, and/or engine 101 may be cooled by a cooling system 132 (e.g., a radiator, fan, etc.) positioned on the chassis 134 proximate E-axle 102, gearbox 104, and/or engine 101.

FIG. 2 shows a schematic depiction of a vehicle 200 having a first example of an electric drive axle 202 that forms at least a portion of a vehicle drive train. Vehicle 200 may be a non-limiting example of vehicle 100 of FIG. 1. The stick diagram of FIG. 2 provides a topology of the vehicle, drive axle, and corresponding components. Vehicle 200 may take a variety of forms, such as a light, medium, or heavy duty vehicle. Further, vehicle 200 may be a battery electric vehicle (BEV) where the internal combustion engine is omitted. Alternatively, vehicle 200 may be a hybrid electric vehicle with an internal combustion engine providing power to a battery or motive power to another drive axle. For instance, in one use-case hybrid vehicle configuration, the internal combustion engine may assist in recharging an energy storage device 203, during certain conditions. In another use-case hybrid vehicle configuration, the internal combustion engine may be configured to provide rotational energy to a differential 204 or other suitable locations in the gear train. In yet another use-case hybrid vehicle configuration, the engine may provide rotational input to another drive axle.

Electric drive axle 202 includes an electric motor-generator 206, although motors without regenerative capabilities have been contemplated. Electric motor-generator 206 includes a stator 208 and a rotor 210. Motor-generator 206 may be electrically coupled to the energy storage device 203 (e.g., battery, capacitor, combinations thereof, and the like). Arrows 212 signify the energy transfer between electric motor-generator 206 and energy storage device 203 that may occur during different modes of system operation. Electric motor-generator 206 may include conventional components for generating rotational output (e.g., forward and reverse drive rotational output) and/or electrical energy for recharging energy storage device 203 such as a rotor electromagnetically interacting with a stator, to provide the aforementioned energy transfer functionality.

Motor-generator 206 includes a rotor shaft 214, with a first rotor shaft bearing 216 and a second rotor shaft bearing 218 coupled thereto. As described herein, a bearing is a device used to allow rotation of a shaft or other component. Roller bearings, ball bearings, thrust bearings, combinations thereof, and the like may be used. Bearings 216, 218 as well as the other bearings described herein may therefore include components such as inner races, outer races, roller elements (e.g., ball bearings, cylindrical rollers, tapered cylindrical rollers, etc.). Moreover, the size and/or configuration of at least a portion of the bearings may vary, in some cases. However, at least a portion of the bearings may have similar sizes and/or constructions. Factors such as shaft loading, expected shaft speed, gear sizing, packaging constraints, etc. may be taken into account when selecting the types of bearing used in the gear train.

Electric drive axle 202 includes a gearbox 223 with a gear train 224 with multiple gears. To elaborate, gear train 224 may have a fixed ratio with multiple stages. It will therefore be understood that gear train 224 is included in a multi-stage gear train assembly 227. A stage in the gear train is formed by two differently sized gears drivingly connected to and meshing with one another. Providing a fixed ratio gear reduction decreases system complexity and increases system reliability. Gear train 224 may include various gears, such as a first gear 226, a second gear 228, and a third gear 232.

Rotor shaft 214 is profiled to extend through and away from second rotor shaft bearing 218 in a cantilevered manner, such that rotor shaft 214 serves as a mount for one or more input gears, such as a first gear 226. More specifically, first gear 226 is coupled to a cantilevered portion 225 of rotor shaft 214 extending through second rotor shaft bearing 218, outside motor-generator 206 (e.g., at an opposite side of second rotor shaft bearing 218 as electric motor-generator 206). While first gear 226 is depicted as a single input gear in FIG. 2, it should be appreciated that in other embodiments, a plurality of input gears may be mounted on rotor shaft 214 without departing from the scope of this disclosure. In various embodiments, first gear 226 is coupled to rotor shaft 214 via splines (or other methods), where a first set of splines of first gear 226 meshes with a corresponding second set of splines of cantilevered portion 225 of rotor shaft 214.

Additionally, rotor shaft 214 may serve as a mount for a park lock gear 262 coupled to a park lock device 260. Park lock device 260 may selectively inhibit a motion of park lock gear 262, in response to user input (e.g., a driver applying a parking brake).

An advantage of the disclosed configuration of rotor shaft 214, where first gear 226 is coupled to cantilevered portion 225 of rotor shaft 214 extending through second rotor shaft bearing 218, is that a separate input shaft typical of electric drive axles may be eliminated. In other words, the cantilevered portion of rotor shaft 214 that extends through second rotor shaft bearing 218 may perform the functionality of the input shaft via a design that is more compact, thereby reducing a weight and cost of the electric drive axle. Additionally, by replacing an input shaft coupled to a rotor shaft via splines with an extended rotor shaft as a continuous/monolithic structure, a possibility of misalignment issues between the rotor shaft and the input shaft may be reduced, and an efficiency with which power is transferred between the rotor shaft and the input gears may be increased. Further, by positioning second rotor shaft bearing 218 adjacent to electric motor-generator 206, and mounting first gear 226 and/or park lock gear 262 on cantilevered portion 225 of rotor shaft 214 (e.g., on an opposite side of second rotor shaft bearing 218 as electric motor-generator 206), an increased load on second rotor shaft bearing 218 may be better balanced. A size of second rotor shaft bearing 218 may be increased (e.g., greater than first rotor shaft bearing 216) to support the increased load. An additional advantage of positioning second rotor shaft bearing 218 adjacent to electric motor-generator 206, and mounting first gear 226 and/or park lock gear 262 on cantilevered portion 225 of rotor shaft 214 is that second rotor shaft bearing 218 may be supported by a second (e.g., middle) separate housing section of a multi-piece housing of electric drive axle 202, where a recess for second rotor shaft bearing 218 may be more accessible during an assembly of electric drive axle 202. The supporting of rotor shaft 214 by different sections of a multi-piece housing is described in greater detail below in reference to FIG. 3.

Second gear 228 is coupled to an intermediate shaft 230 (also referred to herein as layshaft 230) and rotating therewith, and third gear 232 is coupled to the intermediate shaft 230 and rotating therewith. In gear train 224, first gear 226 meshes with second gear 228. As described herein, a gear mesh is formed between mated gear teeth and enables power to be transferred between the meshed gears. Intermediate shaft 230 is supported by a first layshaft bearing 242 and a second layshaft bearing 243, which facilitate rotation of the shaft. In various embodiments, first layshaft bearing 242 and second layshaft bearing 243 may be supported by different sections of a multi-piece housing of electric drive axle 202, as described in greater detail below in reference to FIG. 3.

Third gear 232 meshes with a differential gear 234 (e.g., input ring gear) in a differential 204. Differential 204 may be supported by a first differential bearing 244 and a second differential bearing 245. In various embodiments, the first differential bearing 244 and the second differential bearing 245 may be supported by different sections of a multi-piece housing of electric drive axle 202, as described in greater detail below in reference to FIG. 3.

Differential 204 is designed to allow for axle shaft speed differentiation. Axle shafts 236 are rotationally coupled to one or more drive wheels 238, indicated by arrows 240. Axle shafts 236 may form part of an axle 237. Axle 237 may be a beam axle, in one example. A beam axle, also referred to in the art as a solid axle or rigid axle, may be an axle with mechanical components structurally supporting one another and extending between drive wheels coupled to the axle. Thus, the camber angle between the wheels may remain substantially unchanged as the axle moves through its travel. For instance, the beam axle may be a structurally continuous axle spanning the drive wheels on a lateral axis, in one embodiment. In another embodiment, the beam axle may include co-axial shafts of the differential.

Differential 204 may include components such as a case housing gearing such as pinion gears, spider gears, etc. to achieve the aforementioned torque transfer functionality. To elaborate, differential 204 may be an electronic locking differential, in one example. In another example, differential 204 may be an electronic limited slip differential or a torque vectoring dual clutch. In other examples, an open differential may be used. Referring to the locking differential example, when unlocked, the locking differential may allow drive wheels 238 to spin at different speeds and conversely, when locked, the locking differential may force the drive wheels to rotate at the same speed. In this way, the gearbox configuration can be adapted to increase traction under certain driving conditions. In the case of the limited slip differential, differential 204 allows the deviation of the speed between axle shafts 236 coupled to drive wheels 238 to be constrained.

The power path through electric drive axle 202 may travel from rotor shaft 214 to first gear 226, from first gear 226 to second gear 228, from second gear 228 to third gear 232, from the third gear 232 to differential gear 234, and through differential 204 and axle shafts 236 to drive wheels 238.

Electric drive axle 202 includes a lubrication system 252. Lubrication system 252 is configured to deliver lubricant (e.g., oil) to gearbox components such as bearings 216, 218, 242, 243, and/or 244 as well as the interface between first gear 226 and second gear 228 and the interface between third gear 232 and differential gear 234. Spray bars may be used to lubricate the gears, for example, as shown by arrow 256, although other types of components for routing lubricant to the gears such as splash lubrication devices may additionally or alternatively be utilized.

Referring now to FIG. 3, an electric drive axle 300 is shown, which may be a non-limiting example of the electric drive axle 202 described above in reference to FIG. 2. Electric drive axle 300 includes an electric motor 301, comprising a rotor 304 within a stator 302 (e.g., stator 208 and rotor 210 of FIG. 2). A rotor shaft 309 of rotor 304 is supported at a first side 396 of electric drive axle 300 by a first rotor shaft bearing 306, and at a second side 398 of electric drive axle 300 by a second rotor shaft bearing 310.

Electric drive axle 300 includes a multi-piece housing 303, where rotor shaft 309 may be supported at different sides by different housing sections of multi-piece housing 303. Multi-piece housing 303 comprises a first housing section 312, a second housing section 308, and a third housing section 321. In various embodiments, each of the first housing section 312, the second housing section 308, and the third housing section 321 may be a monolithic housing section formed as a single piece during manufacturing, including no joints. For example, one or more of the first housing section 312, the second housing section 308, and the third housing section 321 may be cast as a single mold.

In various embodiments, first rotor shaft bearing 306 may be supported by first housing section 312, and second rotor shaft bearing 310 may be supported by second housing section 308. Additionally, first housing section 312 and second housing section 308 may overlap around electric motor 301 to create a cooling jacket. Specifically, an outer cooling jacket portion 336 of second housing section 308 may extend over and outside an inner cooling jacket portion 338 of first housing section 312, thereby creating a plurality of cooling jacket channels 340 arranged circumferentially around stator 302.

As depicted in FIG. 3, at a top side 380 of electric drive axle 300, outer cooling jacket portion 336 of second housing section 308 forms an upper (outer) boundary of cooling jacket channels 340, and inner cooling jacket portion 338 of first housing section 312 forms a lower (inner) boundary of cooling jacket channels 340. A contact between outer cooling jacket portion 336 and inner cooling jacket portion 338 may be sealed via one or more housing seals 345. At a bottom side 382 of electric drive axle 300, outer cooling jacket portion 336 of second housing section 308 is depicted as extending under inner cooling jacket portion 338 of first housing section 312. Accordingly, at bottom side 382, outer cooling jacket portion 336 forms a lower (outer) boundary of cooling jacket channels 340, and inner cooling jacket portion 338 forms an upper (inner) boundary of cooling jacket channels 340. A cooling liquid may be circulated around electric motor 301 via the plurality of cooling jacket channels 340 by a pump and heat exchanger (not depicted in FIG. 3). An input lip seal 386 that separates dry motor active parts from lubricated gears and bearings may be supported by a lip seal support 388 of the second housing section 308. By integrating the lip seal support 388 into the second housing section 308, a single seal may be used rather than multiple seals for gear lubrication oil and rotor bearing lubrication.

In various embodiments, a size of each cooling jacket channel 340 underneath stator 302 (e.g., at the bottom side 382) may be different than a size of the cooling jacket channel 340 at a top of stator 302 (e.g., at the top side 380). For example, a first height 350 of each cooling jacket channel 340 underneath stator 302 may be greater than a second height 348 of each cooling jacket channel 340 at the top of stator 302.

In other words, electric drive axle 300 includes a cooling system for electric motor 301, where the cooling system comprises a plurality of cooling jacket channels 340 surrounding the electric motor. An inner boundary of the cooling jacket channels 340 may be formed by a plurality of recesses 347 in first housing section 312, where the recesses 347 are created by a plurality of cooling jacket channel walls 346 protruding outward from an outer surface of inner cooling jacket portion 338, towards outer cooling jacket portion 336 of second housing section 308. An outer boundary of cooling jacket channels 340 may be formed by an inner surface of outer cooling jacket portion 336 of second housing section 308, such that the cooling jacket channels 340 are created by sliding first housing section 312 into the first side of second housing section 308. In some embodiments, the inner surface of outer cooling jacket portion 336 may be smooth. In other embodiments, the inner surface of outer cooling jacket portion 336 may include recesses formed by protruding walls, similar to recesses 347. The recesses may be of a different size than recesses 347, or the recesses may be the same size as recesses 347.

Second rotor shaft bearing 310 may be mounted in second housing section 308 from direction 390. Lip seal 386 may be mounted in second housing section 308 from direction 392. First rotor shaft bearing 306 may be pre-assembled on a shaft of rotor 304 prior to being inserted into second housing section 308 from direction 392, passing through the previously assembled second rotor shaft bearing 310. Stator 302 may be pre-assembled inside first housing section 312. First housing section 312 may then be inserted inside second housing section 308, without stator 302 and rotor 304 being in contact with each other. First housing section 312 may support first rotor shaft bearing 306. First housing section 312 may then be bolted to second housing section 308 via one or more bolts 349, from second direction 392 on first side 396. Thus, an advantage of multi-piece housing 303 is that first housing section 312 and second housing section 308 may be efficiently manufactured and assembled, as components of electric drive axle 300 may be inserted into recesses of first housing section 312 and second housing section 308 from different directions. In this way, electric drive axle 300 may be assembled more efficiently and quickly than in an alternative configuration without a multi-piece housing.

Rotor shaft 309 is cantilevered, where a portion of rotor shaft 309 (e.g., cantilevered portion 225 of FIG. 2) extends past second rotor shaft bearing 310 through a gearbox 332 of electric drive axle 300. One or more input gears 314 may be rotatably coupled to the cantilevered portion of rotor shaft 309. In various embodiments, the one or more input gears 314 are coupled to rotor shaft 309 via an engagement of a plurality of splines 316 of the one or more input gears 314 with a corresponding plurality of splines of rotor shaft 309. In addition, a park lock gear 307 (e.g., park lock gear 262 of FIG. 2) may be rotatably coupled to the cantilevered portion of rotor shaft 309 The park lock gear 307 may be interact with a parklock mechanism in the drive axle 300. One or more input gears 314 and the park lock gear 307 may be axially packed and kept in place by a locking screw 352. In other examples, a different type of locking device may be used. In FIG. 3, park lock gear 307 is depicted on a right side of the one or more input gears 314 (e.g., closer to rotor 304). In other examples, the one or more input gears 314 may be arranged on rotor shaft 309 closer to rotor 304 (e.g., on the right in FIG. 3), and park lock gear 307 may be arranged on an opposite side of the one or more input gears 314 or not be present at all. (e.g., on the left in FIG. 3, farther from rotor 304). In other configurations, parklock gear may be mounted to the right of the bearing 306.

In various embodiments, second rotor shaft bearing 310 may be larger than first rotor shaft bearing 306, to accommodate for additional loading due to integration of the one or more input gears 314 and park lock gear 307 on the cantilevered portion of rotor shaft 309.

The one or more input gears 314 may mesh with a corresponding set of one or more output gears 319 rotatably coupled to a layshaft 318 (e.g., intermediate shaft 230 of FIG. 2) of electric drive axle 300. Torque generated by rotor 304 may thus be transferred through rotor shaft 309 to layshaft 318 via the one or more input gears 314. The torque may then be transferred from layshaft 318 to a differential 322 (e.g., differential 204 of FIG. 2), via one or more differential gears 320 coupled to layshaft 318, to rotate a first axle shaft 324 and a second axle shaft 325 coupled to the differential 322. Differential 322 may be rotatably coupled to second axle shaft 325 via a first set of side gears 323, and differential 322 may be rotatably coupled to first axle shaft 324 via a second set of side gears 327, where torque generated on layshaft 318 is transferred to side gears 323 and 327 via a set of pinion gears 359.

Layshaft 318 may be supported by a first layshaft bearing 330 and a second layshaft bearing 331. In various embodiments, first layshaft bearing 330 and second layshaft bearing 331 may be supported by different sections of multi-piece housing 303 of electric drive axle 300. For example, first layshaft bearing 330 may be supported by second housing section 308, and second layshaft bearing 331 may be supported by third housing section 321. Second housing section 308 and third housing section 321 may be advantageously configured to allow for an assembly of gearbox 332, layshaft 318, differential 322, and other associated components into second housing section 308 from the second side 398 of electric drive axle 300 (e.g., an opposing side of the electric motor-generator 301), from first direction 390 (e.g., from a left side of FIG. 3).

For example, a second recess 333 of second housing section 308 for first layshaft bearing 330 may be accessible from first direction 390, such that first layshaft bearing 330 may be more quickly and efficiently assembled into second housing section 308 than into a different type of housing where second recess 333 is not easily accessible from second direction 390. Layshaft 318 may then be more quickly and easily inserted into first layshaft bearing 330 supported by second housing section 308 from first direction 390, and more easily aligned than in an alternative housing configuration.

Similarly, differential 322 may be inserted into a first differential bearing 356 supported by second housing section 308, where first differential bearing 356 may be set into a third recess 357 of second housing section 308 accessible from first direction 390. Differential gears 320 may then be coupled to differential 322 to engage with layshaft 318, and first axle shaft 324 may be inserted through first differential bearing 356.

Third housing section 321 may be installed around gearbox 332, layshaft 318, and differential 322 from first direction 390. Prior to installing third housing section 321 around layshaft 318 and differential 322, second layshaft bearing 331 may be installed into a fourth recess 334 of third housing section 321 from the second direction 392, and second differential bearing 354 may be installed into a fifth recess 358 of third housing section, such that layshaft 318 is supported by second layshaft bearing 331 of third housing section 321, and second axle shaft 325 may be inserted through and supported by a second differential bearing 354 of third housing section 321. Third housing section 321 may then be attached to second housing section 308, for example, via a bolt 364, under differential 322.

In some embodiments, the one or more output gears 319 and/or the one or more differential gears 320 may be coupled to layshaft 318 via splines. In other embodiments, the one or more output gears 319 and/or the one or more differential gears 320 may be machined, press-fitted or casted as part of layshaft 318. In FIG. 3, the one or more output gears 319 are depicted on a right side of the one or more differential gears 320 (e.g., closer to rotor 304). In other embodiments, the one or more output gears 319 may be arranged on layshaft 318 on a left side of the one or more differential gears 320 (e.g., farther from rotor 304).

FIGS. 1 and 3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Figure 4:
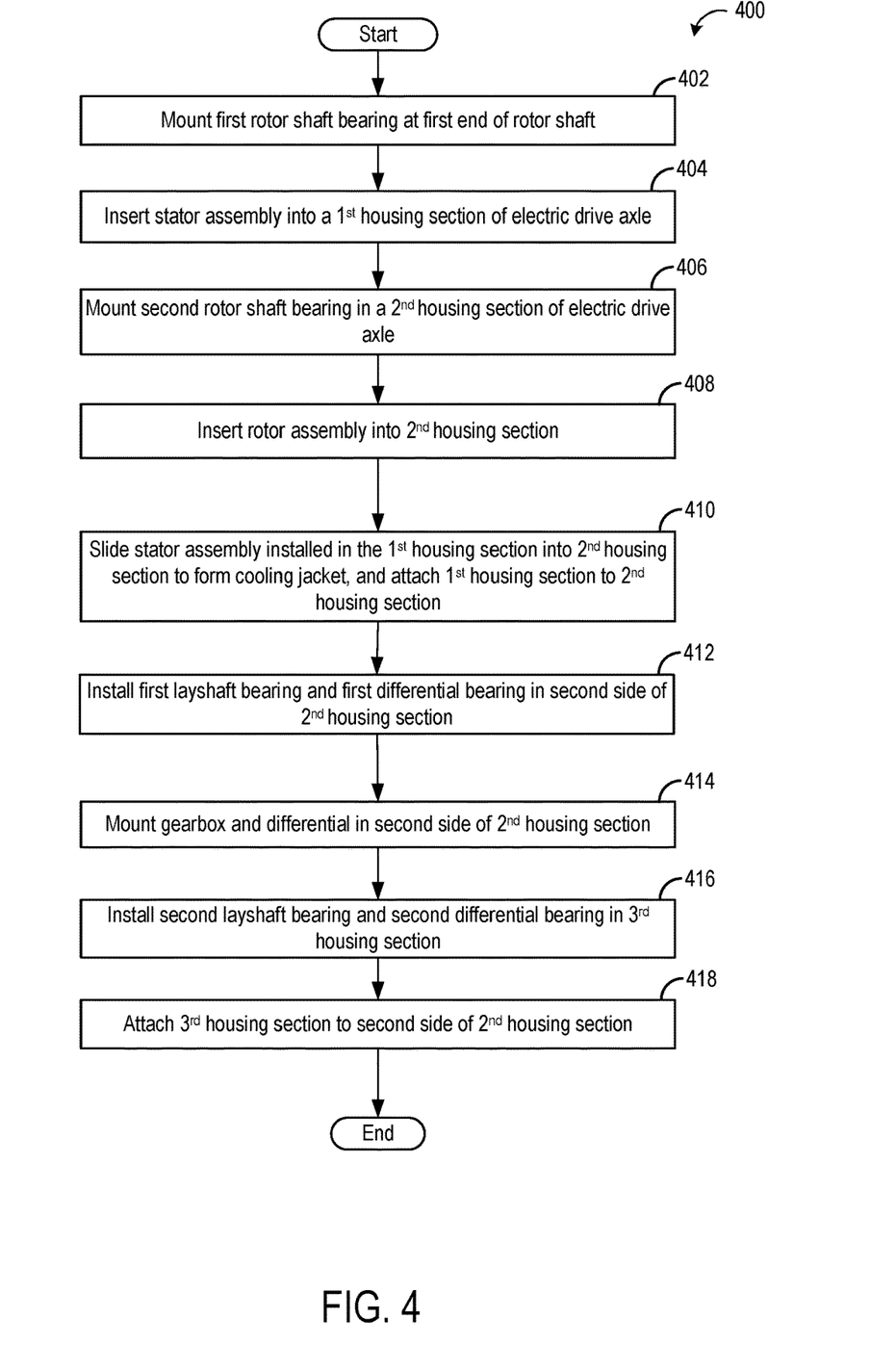
FIG. 4 is a flowchart illustrating an exemplary method for assembling an electric drive axle with an integrated layout, in accordance with one or more embodiments of the present disclosure.

Referring now to FIG. 4, an exemplary method 400 is shown for assembling an electric drive axle with an integrated layout including a multi-piece housing, such as electric drive axle 300 of FIG. 3. As described above, by including the multi-piece housing, components of the electric drive axle (e.g., an electric motor, a gearbox, and a differential) may be assembled into different housing sections of the multi-piece housing, which may subsequently be attached to form a fully assembled electric drive axle. In particular, by dividing the multi-piece housing into a first housing section on a first side of the electric drive axle (e.g., first housing section 312 of FIG. 3), a third housing section on a second side of the electric drive axle (e.g., third housing section 321 of FIG. 3), and a second housing section in between the first housing section and the third housing section (e.g., second housing section 308 of FIG. 3), the housing sections may be individually cast such that the components may be installed efficiently and quickly into a relevant housing section from either a first direction or a second, opposing direction. The housing sections may then be attached. Additionally, a cooling jacket surrounding the electric motor may be formed between overlapping portions of the first housing section and the second housing section as the multi-piece housing is assembled.

Method 400 begins at 402, where method 400 includes mounting a first rotor shaft bearing (e.g., first rotor shaft bearing 306) of the electric drive axle at a first end of a shaft of a rotor assembly (e.g., rotor 304) of the electric drive axle.

At 404, method 400 includes inserting a stator assembly (e.g., stator 302) into the first housing section (e.g., first housing section 312) of the electric drive axle, in a first direction (e.g., first direction 390 of FIG. 3). The first housing section may be an end housing section of the multi-piece housing. In various embodiments, the stator assembly may be press-fitted inside the first housing section. The stator assembly may also be glued to the first housing section.

At 406, method 400 includes mounting a second rotor shaft bearing (e.g., second rotor shaft bearing 310) in a first side of the second housing section (e.g., second housing section 308) of the electric drive axle. The second housing section may be a middle housing section of the multi-piece housing. Additionally, a lip seal (e.g., lip seal 386) may be mounted in the second housing section, which may separate dry motor active parts from lubricated gears and bearings of the electric drive axle. The seat of the lip seal (e.g., lip seal support 388) for transmission lubricant may be integrated in the second housing. As stated above, by integrating the lip seal support into the second housing section, a single seal may be used rather than multiple seals for gear lubrication oil and rotor bearing lubrication.

At 408, method 400 includes inserting the rotor assembly into the first side of the second housing section, in a second direction (e.g., second direction 392 of FIG. 3). The rotor assembly may be fitted into the first rotor shaft bearing mounted at step 402.

At 410, method 400 includes inserting the stator assembly, which is already pre-assembled into the first side of the first housing section, into the second housing section, in the second direction. The stator assembly may slide into the second housing section such that the stator does not come in contact with the rotor. After the stator assembly is inserted into the second housing section, the first housing section may support the first rotor shaft bearing, and the second housing section may be attached (e.g., bolted) to the first housing section.

When the stator assembly including the first housing section is inserted into the second housing section, a cooling jacket may be formed around the electric motor. In various embodiments, the cooling jacket is coaxially aligned with the rotor, comprising a plurality of cooling jacket channels (e.g., cooling jacket channels 340) extending circumferentially around the stator of the electric motor. The cooling jacket may be formed between a first portion of the first housing section and a second, overlapping portion of the second housing section, such that each cooling jacket channel may have an inner boundary formed by the first housing section and an outer boundary formed by the second housing section. In some embodiments, the outer boundary formed by the second, overlapping portion of the second housing section may be a flat surface, and the inner boundary formed by the first portion of the first housing section may include a plurality of recessed areas separated by protruding walls, such that each recessed area forms an individual cooling jacket channel when sealed by the outer boundary.

Thus, as the first portion of the first housing section is slid into the second, overlapping portion of the second housing section, parallel cooling jacket channels may be created based on a final position of the first housing section within the second housing section, at which the first housing section may be bolted to the first side of the second housing section.

As an example, the first portion of the first housing section creating the inner boundary of the cooling jacket channels may include a first cooling jacket wall created by a first protrusion of the first housing section, from an outer surface of the first portion of the first housing section towards an inner surface of the outer boundary formed by the second, overlapping portion of the second housing. The first cooling jacket wall may be at an end of the first portion of the first housing section (e.g., the end that interfaces with the second housing section). A second cooling jacket wall may be created by a second protrusion of the first housing section, from the outer surface of the first portion of the first housing section towards the inner surface of the outer boundary formed by the second, overlapping portion of the second housing. A first cooling jacket channel may be formed within a first recessed area of the first portion of the first housing section, between the first cooling jacket wall and the second cooling jacket wall (and sealed by the flat surface of the second, overlapping portion of the second housing section). A third cooling jacket wall may be created by a third protrusion of the first housing section, from the outer surface of the first portion of the first housing section towards the inner surface of the outer boundary formed by the second, overlapping portion of the second housing section. A second cooling jacket channel may be formed within a second recessed area of the first portion of the first housing section, between the second cooling jacket wall and the third cooling jacket wall (and sealed by the flat surface of the second, overlapping portion of the second housing section). A fourth cooling jacket wall may be created by a fourth protrusion of the first housing section, from the outer surface of the first portion of the first housing section towards the inner surface of the outer boundary formed by the second, overlapping portion of the second housing section. A third cooling jacket channel may be formed within a third recessed area of the first portion of the first housing section, between the third cooling jacket wall and the fourth cooling jacket wall (and sealed by the flat surface of the second, overlapping portion of the second housing section). In this way, the plurality of cooling jacket channels may be created between the first portion of the first housing section and the second, overlapping section of the second housing section. In one embodiment, five protruding cooling jacket walls create four cooling jacket channels around the electric motor. In other embodiments, a greater or lesser number of cooling jacket channels may be created.

In various embodiments, a size of the cooling jacket channels may vary between a top side (e.g., top side 380) of the electric drive axle and a bottom side (e.g., bottom side 382) of the electric drive axle. For example, a first height (e.g., first height 350) of the protruding cooling jacket walls at the bottom side of the electric drive axle may be greater than a second height (e.g., second height 348) of the protruding cooling jacket walls at the top side of the electric drive axle.

At 412, method 400 may include installing a first layshaft bearing and a first differential bearing in the second side of the second housing section. The first layshaft bearing may be installed in a recess (e.g., second recess 333) in the second side of the second housing section accessible from the first direction. The first differential bearing may be installed in a recess (e.g., third recess 357) in the second side of the second housing section accessible from the first direction.

At 414, method 400 may include mounting a gearbox and a differential in the second side of the second housing section. Installing the gearbox in the second side of the second housing section may include inserting a first end of an intermediate shaft (e.g., layshaft 318) into the first layshaft bearing installed in the second housing section, in the first direction. Likewise, installing the differential in the second side of the second housing section may include inserting a first axle shaft (e.g., first axle shaft 324) into and through the first differential bearing installed in the second housing section, in the first direction.

In some embodiments, the gearbox and the differential may not be mounted in the second side of the second housing section, and the gearbox and the differential may be mounted in the third housing section. After the gearbox and the differential are mounted in the third housing section, the third housing section may be attached to the second side of the second housing section such that the gearbox and the differential are inserted into the first layshaft bearing and the first differential bearing, respectively.

At 416, method 400 includes installing a second layshaft bearing and a second differential bearing in the third housing section. Installing the second layshaft bearing in the third housing section may include inserting the second layshaft bearing into a recess of the third housing section in the second direction. Likewise, installing the second differential bearing in the third housing section may include inserting the second differential bearing into a recess of the third housing section, in the second direction.

At 418, method 400 includes attaching the third housing section to the second side of the second housing section. Attaching the third housing section to the second side of the second housing section includes sliding a second, opposite end of the intermediate shaft into the second layshaft bearing installed in the third housing section, to align and secure the intermediate shaft between the second housing section and the third housing section. Attaching the third housing section to the second side of the second housing section may also include sliding a second axle shaft (e.g., second axle shaft 325) into and through the second differential bearing installed in the third housing section, to align and secure the differential between the second housing section and the third housing section. When the intermediate shaft and the differential are aligned and secured between the second housing section and the third housing section, the third housing section may be bolted to the second housing section, and method 400 ends.

Thus, systems and methods are presented herein to increase an efficiency of an electric drive axle, while reducing a size, cost, and assembly time of the electric drive axle. By using a cantilevered rotor shaft to support input gears, rather than a dedicated input shaft, the size of the electric drive assembly may be reduced. Misalignment issues resulting from using a separate input shaft may be avoided, while increasing the efficiency of the electric drive assembly by shortening a power path from an electric motor to an axle of a vehicle. The housing of the electric drive axle may also be divided into three independent sections, each cast as single pieces, thereby allowing for assembly of components of the electric drive axle into each independent section from different sides. As a result, the electric drive assembly may be assembled more quickly and efficiently than with other housing designs. Additionally, one or both overlapping housing sections of the electric drive axle enclosing the electric motor may be cast with protruding walls with interspersed recesses, which may advantageously form channels of a cooling jacket as the overlapping housing sections are assembled together, which may reduce a manufacturing and/or assembly time of the electric drive axle.

The technical effect of mounting input gears on the rotor shaft and assembling the electric drive axle into different, overlapping housing sections is that a size, cost, and assembly time of the electric drive axle may be reduced.

An additional technical effect is that the input gear self-aligns with the rotor shaft, due to the input gears being mounted directly on the rotor shaft, rather than having a dedicated input shaft supported by other bearings supported by the housing. An alignment of the input gear mounted on the shaft may be more precise than an alignment of the input gear where an input shaft is independently supported by other bearings.

The disclosure also provides support for an electric drive assembly, comprising: an electric motor having a rotor shaft supported by a first rotor shaft bearing and a second rotor shaft bearing, a gearbox having a layshaft layout, where at least one input gear of the gearbox is mounted on the rotor shaft, and a multi-piece housing, the multi-piece housing including: a first housing section supporting the first rotor shaft bearing and a stator of the electric motor, the first housing section defining an inner boundary of a motor cooling jacket, and a second housing section partially overlapping with the first housing section, the second housing section partially enclosing the gearbox and partially enclosing the electric motor, the second housing section supporting the second rotor shaft bearing, the second housing section defining an outer boundary of the motor cooling jacket. In a first example of the system, a portion of the rotor shaft extends through the second rotor shaft bearing in a cantilevered manner, and the at least one input gear of the gearbox is coupled to the cantilevered portion of the rotor shaft. In a second example of the system, optionally including the first example, a size of the second rotor shaft bearing supported by the second housing section is greater than a size of the first rotor shaft bearing supported by the first housing section. In a third example of the system, optionally including one or both of the first and second examples, the second housing section is a monolithic housing section formed in a single piece, including no joints, that attaches to the first housing section at a first side of the electric drive assembly, and attaches to a third housing section of the multi-piece housing at a second, opposing side of the electric drive assembly, the third housing section partially enclosing the gearbox and a differential of the electric drive assembly. In a fourth example of the system, optionally including one or more or each of the first through third examples, the at least one input gear is coupled to the rotor shaft via a spline coupling. In a fifth example of the system, optionally including one or more or each of the first through fourth examples, a plurality of input gears are mounted on the rotor shaft, each input gear of the plurality of input gears having a different gear ratio. In a sixth example of the system, optionally including one or more or each of the first through fifth examples, the system further comprises: a park lock gear mounted on the rotor shaft. In a seventh example of the system, optionally including one or more or each of the first through sixth examples, the at least one input gear and the park lock gear are axially packed and maintained in place by a locking device. In a eighth example of the system, optionally including one or more or each of the first through seventh examples, the locking device is a screw.

The disclosure also provides support for a method, comprising: during manufacturing of an electric drive axle with an integrated layout and a multi-piece housing, the multi-piece housing including first housing section, a shared, second housing section, and a third housing section: assembling a first part of an electric motor of the electric drive axle in the first housing section, assembling a second part of the electric motor in the second housing section, attaching the first housing section to a first side of the second housing section, to form a cooling jacket around the electric motor, assembling a gearbox and a differential of the electric drive axle at a second side of the second housing section, the second side opposing the first side, and attaching the third housing section to the second side of the second housing section. In a first example of the method, assembling the first part of the electric motor in the first housing section further comprises: mounting a first rotor shaft bearing in the first housing, and inserting a stator assembly of the electric motor into the first housing. In a second example of the method, optionally including the first example, assembling the second part of the electric motor in the second housing section further comprises: mounting a second rotor shaft bearing in the first side of the second housing, and mounting a rotor of the electric motor into the first side of the second housing, a first end of a shaft of the rotor fitted into the second rotor shaft bearing, the first end of the rotor shaft including a portion that extends through the second rotor shaft bearing in a cantilevered manner. In a third example of the method, optionally including one or both of the first and second examples, attaching the first housing section to the first side of the second housing section further comprises: inserting the stator assembly and first housing into the first side of the second housing, the stator assembly not coming in contact with the rotor, and bolting the first housing section to the first side of the second housing section. In a fourth example of the method, optionally including one or more or each of the first through third examples, attaching the first housing section to the first side of the second housing section to form a cooling jacket around the electric motor further comprises inserting an inner cooling jacket portion of the first housing section into an outer cooling jacket portion of the second, shared housing section, to form a plurality of cooling jacket channels, where the outer cooling jacket portion forms an outer boundary of the plurality of cooling jacket channels, and the inner cooling jacket portion forms an inner boundary of the plurality of cooling jacket channels. In a fifth example of the method, optionally including one or more or each of the first through fourth examples, an interface between the inner cooling jacket portion of the first housing section and the outer cooling jacket portion of the second, shared housing section is sealed by one or more elastic rubber rings. In a sixth example of the method, optionally including one or more or each of the first through fifth examples, assembling the gearbox and the differential of the electric drive axle in the second side of the second housing section further comprises: attaching a first layshaft bearing to the second side of the second, shared housing section, inserting a first end of a layshaft of the gearbox into the first layshaft bearing, attaching a first differential bearing to the second side of the second, shared housing section, and inserting a first axle shaft of the differential into the first differential bearing. In a seventh example of the method, optionally including one or more or each of the first through sixth examples, attaching the third housing section to the second side of the second, shared housing section further comprises: attaching a second layshaft bearing to the third housing section, inserting a second end of a layshaft of the gearbox into the second layshaft bearing, attaching a second differential bearing to the third housing section, inserting a second axle shaft of the differential into the second differential bearing, and bolting the third housing section to the second side of the second, shared housing section.

The disclosure also provides support for an electric drive assembly, comprising: an electric motor having a rotor shaft supported by a first rotor shaft bearing and a second rotor shaft bearing, a portion of the rotor shaft extending through the second rotor shaft bearing, a gearbox including at least one input gear coupled to the extending portion of the rotor shaft, and a housing including a first housing section, a second housing section, and a third housing section, wherein the first rotor shaft bearing is installed in the first housing section, the second rotor shaft bearing is installed in a first side of the second housing section, the first housing section attached to the first side of the second housing section, and a layshaft of the gearbox is supported by a first layshaft bearing installed in a second, opposing side of the second housing section and a second layshaft bearing is installed in the third housing section, the third housing section attached to the second, opposing side of the second housing section. In a first example of the system, a plurality of cooling jacket channels surrounding the electric motor are formed between an overlapping portion of the first housing section and the second housing section. In a second example of the system, optionally including the first example, an inner boundary of the cooling jacket channels are formed by recesses in the first housing section, and an outer boundary of the cooling jacket channels are formed by a surface of the second housing section, the cooling jacket channels created by sliding the first housing section into the first side of the second housing section.

It will be appreciated that the configurations and routines disclosed herein are exemplary in nature, and that these specific embodiments are not to be considered in a limiting sense, because numerous variations are possible. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An electric drive assembly, comprising:
   an electric motor having a rotor shaft supported by a first rotor shaft bearing and a second rotor shaft bearing;
   a gearbox having a layshaft which is parallel to but offset from the rotor shaft, where an input gear of the gearbox is mounted on the rotor shaft; and
   a multi-piece housing, the multi-piece housing including:
      a first housing section supporting the first rotor shaft bearing and a stator of the electric motor, where the first housing section defines an inner boundary of channels of a motor cooling jacket, where a liquid is circulated through the channels of the motor cooling jacket; and
      a second housing section partially overlapping with the first housing section, the second housing section partially enclosing the gearbox and partially enclosing the electric motor, where the second housing section supports the second rotor shaft bearing, and where the second housing section defines an outer boundary of the motor cooling jacket;
   where the second housing section at least partially encloses a differential which is directly rotationally coupled to the gearbox;
   where a rotational axis of the rotor shaft is parallel to and offset from a rotational axis of the differential; and
   where the second bearing is axially positioned between the input gear and a stator in the electric motor.

2. The electric drive assembly of claim 1, wherein a portion of the rotor shaft extends through the second rotor shaft bearing in a cantilevered manner, and the input gear of the gearbox is coupled to the cantilevered portion of the rotor shaft.

3. The electric drive assembly of claim 2, wherein a size of the second rotor shaft bearing supported by the second housing section is greater than a size of the first rotor shaft bearing supported by the first housing section.

4. The electric drive assembly of claim 1, wherein the second housing section is a monolithic housing section formed in a single piece, including no joints, that attaches to the first housing section at a first side of the electric drive assembly, and attaches to a third housing section of the multi-piece housing at a second, opposing side of the electric drive assembly, the third housing section partially enclosing the gearbox and the differential of the electric drive assembly.

5. The electric drive assembly of claim 1, wherein the input gear is coupled to the rotor shaft via a spline coupling.

6. The electric drive assembly of claim 1, wherein the layshaft includes a first gear and a second gear coupled thereto and wherein the first gear meshes with the input gear.

7. The electric drive assembly of claim 1, further comprising a park lock gear mounted on the rotor shaft.

8. The electric drive assembly of claim 7, wherein the input gear and the park lock gear are axially packed and maintained in place by a locking device.

9. The electric drive assembly of claim 8, wherein the locking device is a screw.

10. A method, comprising:
    during manufacturing of an electric drive axle with an integrated layout and a multi-piece housing, the multi-piece housing including first housing section, a shared, second housing section, and a third housing section:
       assembling a first part of an electric motor of the electric drive axle in the first housing section;
       assembling a second part of the electric motor in the second housing section;
       attaching the first housing section to a first side of the second housing section, to form a cooling jacket around the electric motor;
       assembling a gearbox and a differential of the electric drive axle at a second side of the second housing section, the second side opposing the first side; and
       attaching the third housing section to the second side of the second housing section,
    wherein attaching the first housing section to the first side of the second housing section to form a cooling jacket around the electric motor further comprises inserting an inner cooling jacket portion of the first housing section into an outer cooling jacket portion of the second housing section, to form a plurality of cooling jacket channels, where the outer cooling jacket portion forms an outer boundary of the plurality of cooling jacket channels, and the inner cooling jacket portion forms an inner boundary of the plurality of cooling jacket channels.

11. The method of claim 10, wherein assembling the first part of the electric motor in the first housing section further comprises:
    mounting a first rotor shaft bearing in the first housing; and inserting a stator assembly of the electric motor into the first housing.

12. The method of claim 11, wherein assembling the second part of the electric motor in the second housing section further comprises:
mounting a second rotor shaft bearing in the first side of the second housing; and
mounting a rotor of the electric motor into the first side of the second housing, a first end of a shaft of the rotor fitted into the second rotor shaft bearing, the first end of the rotor shaft including a portion that extends through the second rotor shaft bearing in a cantilevered manner.

13. The method of claim 12, wherein attaching the first housing section to the first side of the second housing section further comprises:
inserting the stator assembly and first housing into the first side of the second housing, the stator assembly not coming in contact with the rotor; and
bolting the first housing section to the first side of the second housing section.

14. The method of claim 10, wherein an interface between the inner cooling jacket portion of the first housing section and the outer cooling jacket portion of the second housing section is sealed by one or more elastic rubber rings.

15. The method of claim 10, wherein assembling the gearbox and the differential of the electric drive axle in the second side of the second housing section further comprises:
attaching a first layshaft bearing to the second side of the second housing section;
inserting a first end of a layshaft of the gearbox into the first layshaft bearing;
attaching a first differential bearing to the second side of the second housing section; and
inserting a first axle shaft of the differential into the first differential bearing.

16. The method of claim 10, wherein attaching the third housing section to the second side of the second housing section further comprises:
attaching a second layshaft bearing to the third housing section;
inserting a second end of a layshaft of the gearbox into the second layshaft bearing;
attaching a second differential bearing to the third housing section;
inserting a second axle shaft of the differential into the second differential bearing; and
bolting the third housing section to the second side of the second housing section.

17. An electric drive assembly, comprising:
an electric motor having a rotor shaft supported by a first rotor shaft bearing and a second rotor shaft bearing, a portion of the rotor shaft extending through the second rotor shaft bearing;
a gearbox including at least one input gear coupled to the extending portion of the rotor shaft; and
a housing including a first housing section, a second housing section, and a third housing section;
wherein
the first rotor shaft bearing is installed in the first housing section, the second rotor shaft bearing is installed in a first side of the second housing section, the first housing section attached to the first side of the second housing section; and
a layshaft of the gearbox is supported by a first layshaft bearing installed in a second, opposing side of the second housing section and a second layshaft bearing is installed in the third housing section, the third housing section attached to the second, opposing side of the second housing section,
wherein a plurality of cooling jacket channels surrounding the electric motor are formed between an overlapping portion of the first housing section and the second housing section, and
wherein an inner boundary of the cooling jacket channels are formed by recesses in the first housing section, and an outer boundary of the cooling jacket channels are formed by a surface of the second housing section, the cooling jacket channels created by sliding the first housing section into the first side of the second housing section.

* * * * *